US010855777B2

(12) United States Patent
Grooters et al.

(10) Patent No.: US 10,855,777 B2
(45) Date of Patent: Dec. 1, 2020

(54) DECLARATIVE SECURITY MANAGEMENT PLUGINS

(71) Applicant: Dell Products L.P., Round Rock, TX (US)

(72) Inventors: Brandon Grooters, Frisco, TX (US); Chooi Peng Low, Plano, TX (US); Brijesh Mishra, Murphy, TX (US)

(73) Assignee: Dell Products L.P.

( * ) Notice: Subject to any disclaimer, the term of this patent is extended or adjusted under 35 U.S.C. 154(b) by 201 days.

(21) Appl. No.: 15/959,525

(22) Filed: Apr. 23, 2018

(65) Prior Publication Data

US 2019/0327315 A1 Oct. 24, 2019

(51) Int. Cl.
*H04L 29/08* (2006.01)
*G06F 9/445* (2018.01)
*H04L 29/06* (2006.01)

(52) U.S. Cl.
CPC .......... *H04L 67/16* (2013.01); *G06F 9/44526* (2013.01); *H04L 67/42* (2013.01)

(58) Field of Classification Search
CPC ............... G06F 9/44526; G06F 16/951; G06F 16/2282; G06F 16/2228; G06F 16/24554; G06F 16/2462; G06F 16/273; G06F 16/285; G06F 3/0481; G06F 16/2423; G06F 16/2428; G06F 16/3322; G06F 16/90324; G06F 16/9577; G06F 2203/04804; G06F 3/04847; G06F 3/0485; G06F 3/04895; H04L 67/16; H04L 67/42; G06Q 30/0641
See application file for complete search history.

(56) References Cited

U.S. PATENT DOCUMENTS

| 8,799,666 | B2 * | 8/2014 | Kesanupalli | G06Q 20/10 |
| | | | | 713/180 |
| 10,574,600 | B1 * | 2/2020 | Chiarella | H04L 51/043 |
| 2004/0049481 | A1 * | 3/2004 | Blevins | G06Q 10/06 |
| 2007/0156913 | A1 * | 7/2007 | Miyamoto | G06F 9/44526 |
| | | | | 709/230 |
| 2009/0006974 | A1 * | 1/2009 | Harinarayan | G06F 16/9535 |
| | | | | 715/738 |
| 2009/0048865 | A1 * | 2/2009 | Breazeale, Jr. | G06Q 50/22 |
| | | | | 705/2 |

(Continued)

OTHER PUBLICATIONS

John Regehr: "Use of Assertions", Feb. 2, 2014 (Feb. 2, 2014), https://blog.regehr.org/archives/1091 (Year: 2014) (Year: 2014).*

*Primary Examiner* — Ninos Donabed
(74) *Attorney, Agent, or Firm* — Baker Botts L.L.P.

(57) ABSTRACT

Systems and methods for a client-server system including a client and a runtime server to provide extended management services utilizing declarative service management plugins. The client may transmit client service data associated with a set of extension declarations of a service plugin package using a client service plugin. The runtime server may add the set of extension declarations to the first set of the management services. The runtime server may receive the client service data from the client. The runtime server may provide a management service of a set of management services for the client that may be based on the client service data and a subset of the set of extension declarations corresponding to the first management service. The first subset of the set of extension declarations may specify how the first management service is provided to the client.

13 Claims, 8 Drawing Sheets

(56) References Cited

U.S. PATENT DOCUMENTS

| | | | | |
|---|---|---|---|---|
| 2010/0153364 A1* | 6/2010 | Kirby | ............... | G06F 16/9562 |
| | | | | 707/722 |
| 2012/0042210 A1* | 2/2012 | Glaser | ............... | G06F 11/3684 |
| | | | | 714/38.1 |
| 2012/0166992 A1* | 6/2012 | Huynh | ............... | H04L 67/10 |
| | | | | 715/771 |
| 2014/0143688 A1* | 5/2014 | Hou | ............... | G06F 3/04886 |
| | | | | 715/760 |
| 2014/0280299 A1* | 9/2014 | Crook | ............... | G06F 16/951 |
| | | | | 707/769 |
| 2015/0363803 A1* | 12/2015 | Thomas | ............ | G06Q 30/0204 |
| | | | | 705/7.33 |
| 2016/0098519 A1* | 4/2016 | Zwir | ............... | G16B 20/00 |
| | | | | 702/19 |
| 2017/0373871 A1* | 12/2017 | Breazeale, Jr. | ..... | H04L 12/1886 |

* cited by examiner

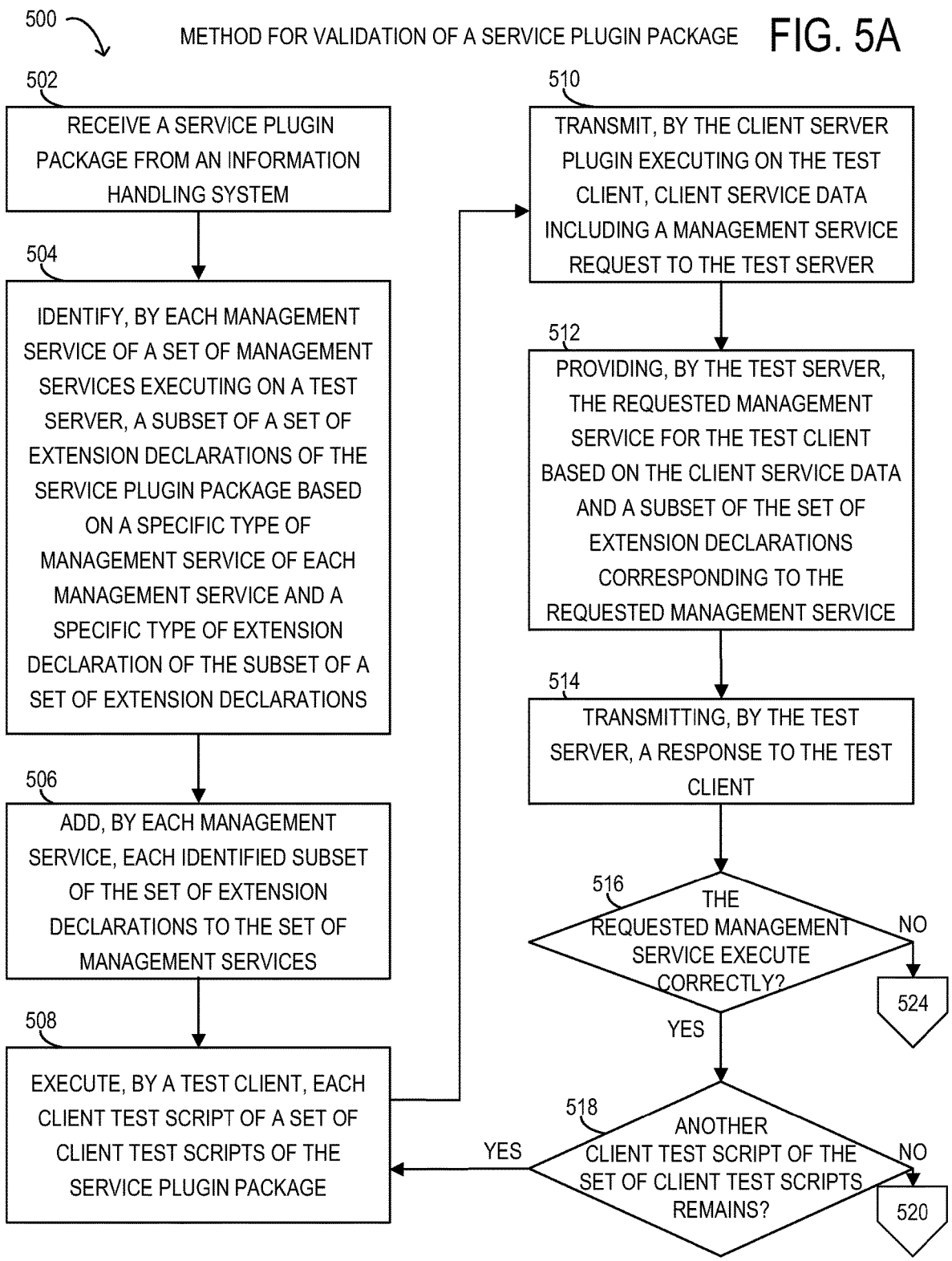

DECLARATIVE SECURITY MANAGEMENT PLUGINS

BACKGROUND

Field of the Disclosure

This disclosure relates generally to information handling systems and, more particularly, to declarative security management plugins.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed client-server system may include a network and a client coupled to the network. The client may transmit client service data associated with a set of extension declarations of a service plugin package using a client service plugin of the service plugin package over the network. The client-server system may also include a runtime server coupled to the network. The runtime server may receive the service plugin package from the network. The runtime server may also access a first set of management services. The runtime server may further add the set of extension declarations to the first set of the management services. The runtime server may also receive the client service data from the client via the network. The runtime server may further provide a first management service of the first set of management services for the client that may be based on the client service data and a first subset of the set of extension declarations corresponding to the first management service. The first subset of the set of extension declarations may specify how the first management service is provided to the client.

In a number of the disclosed embodiments of the client-server system, the client may, prior to the transmission of the client service data, transmit the service plugin package to a validation system via the network, validate the service plugin package utilizing the validation system, receive a validation indicator that may indicate whether the service plugin package is valid from the validation system, and when the validation indicator indicates that the service plugin package is valid, transmit the service plugin package to the runtime server via the network.

In a number of the disclosed embodiments of the client-server system, a test client of the validation system may receive the service plugin package from the client via the network, execute a set of client test scripts of the service plugin package that may cause the client service plugin to transmit test client service data associated with the set of extension declarations over the network, and when the execution of the set of client test scripts is complete, transmit the validation indicator that may indicate whether the service plugin package is valid to the client. The validation indicator may be based on each execution result of each client test script of the set of client test scripts. A test runtime server may receive the service plugin package associated with the client service plugin from the client via the network and access a second set of the management services. The second set of the management services may correspond to the first set of the management services. The test runtime server may also add the set of extension declarations to the second set of the management services, receive the test client service data from the test client via the network, and provide a second management service of the second set of management services for the test client based on the test client service data and a second subset of the set of extension declarations corresponding to the second management service.

In a number of the disclosed embodiments of the client-server system, the service plugin package may comprise one or more of a service plugin identification, a service plugin name, a service plugin description, a client service plugin, a set of client test scripts, a service plugin declaration, a set of extension declarations, a set of help files, management service installation (MSI) information, a set of content files, a set of support files, and security information including security certificates.

In a number of the disclosed embodiments of the client-server system, each extension declaration of the set of extension declarations may comprise a type of the extension declaration that may include one of an event type of the extension declaration that may have event information, a command type of the extension declaration that may have command information, a policy type of the extension declaration that may have policy information, a state type of the extension declaration that may have state information, and a dependency type of the extension declaration that may have dependency information. Each extension declaration of the set of extension declarations may further comprise descriptor information that may describe how the extension declaration may be operationally processed by the runtime server, grouping information that may describe how the extension declaration may be grouped within an existing set of extension declarations of the first set of the management services, ordering information that may describe how the extension declaration may be ordered within the existing set of extension declarations of the first set of the management services, and localization resource information that describes how each extension declaration is processed by the runtime server to support localized resources in multiple locales.

In a number of the disclosed embodiments of the client-server system, the first set of management services may comprise a set of security services.

In a number of the disclosed embodiments of the client-server system, the client may also, prior to the transmission of the client service data over the network, generate the set of extension declarations from a set of assertions within source code of the client service plugin. The set of assertions may specify how the first set of the management services may be extended. The client may also build the service plugin package that may be based on the client server plugin and the set of extension declarations.

In a second embodiment, a disclosed method may include transmitting, by a client of a client-server system, client service data that may be associated with a set of extension declarations of a service plugin package using a client service plugin of the service plugin package over the network. The method may also include receiving, by a runtime server of the client-server system the service plugin package from the network. The method may further include accessing, by the runtime server, a first set of management services. The method may also include adding, by the runtime server, the set of extension declarations to the first set of the management services. The method may further include receiving, by the runtime server, the client service data from the client via the network. The method may also include providing, by the runtime server, a first management service of the first set of management services for the client that may be based on the client service data and a first subset of the set of extension declarations that may correspond to the first management service. The first subset of the set of extension declarations may specify how the first management service may be provided to the client.

In a number of the disclosed embodiments of the method, the method may also include prior to transmitting the client service data, transmitting, by the client, the service plugin package to a validation system via the network, validating, by the client, the service plugin package utilizing the validation system, receiving, by the client, a validation indicator that may indicate whether the service plugin package is valid from the validation system, and when the validation indicator may indicate that the service plugin package is valid, transmitting, by the client, the service plugin package to the runtime server via the network.

In a number of the disclosed embodiments of the method, the method may also include receiving, by a test client of the validation system, the service plugin package from the client via the network, executing, by the test client, a set of client test scripts of the service plugin package that may cause the client service plugin to transmit test client service data associated with the set of extension declarations over the network, and when the execution of the set of client test scripts may be complete, transmitting, by the test client, the validation indicator that may indicate whether the service plugin package is valid to the client. The validation indicator may be based on each execution result of each client test script of the set of client test scripts. The method may also include receiving, by a test runtime server of the validation system, the service plugin package that may be associated with the client service plugin from the client via the network and accessing, by the test runtime server, a second set of the management services. The second set of the management services may correspond to the first set of the management services. The method may further include adding, by the test runtime server, the set of extension declarations to the second set of the management services, receiving, by the test runtime server, the test client service data from the test client via the network, and providing, by the test runtime server, a second management service of the second set of management services for the test client that may be based on the test client service data and a second subset of the set of extension declarations that may correspond to the second management service.

In a number of the disclosed embodiments of the method, the service plugin package may comprise one or more of a service plugin identification, a service plugin name, a service plugin description, a client service plugin, a set of client test scripts, a service plugin declaration, a set of extension declarations, a set of help files, management service installation (MSI) information, a set of content files, a set of support files, and security information including security certificates.

In a number of the disclosed embodiments of the method, each extension declaration of the set of extension declarations may comprise a type of the extension declaration that may include one of an event type of the extension declaration that may have event information, a command type of the extension declaration that may have command information, a policy type of the extension declaration that may have policy information, a state type of the extension declaration that may have state information, and a dependency type of the extension declaration that may have dependency information. Each extension declaration of the set of extension declarations may further comprise descriptor information that may describe how the extension declaration may be operationally processed by the runtime server, grouping information that may describe how the extension declaration may be grouped within an existing set of extension declarations of the first set of the management services, ordering information that may describe how the extension declaration may be ordered within the existing set of extension declarations of the first set of the management services, and localization resource information that describes how each extension declaration is processed by the runtime server to support localized resources in multiple locales.

In a number of the disclosed embodiments of the method, the first set of management services may comprise a set of security services.

In a number of the disclosed embodiments of the method, the method may also include, prior to transmitting the client service data over the network, generating, by the client, the set of extension declarations from a set of assertions within source code of the client service plugin. The set of assertions may specify how the first set of the management services may be extended. The method may also include building, by the client, the service plugin package that may be based on the client server plugin and the set of extension declarations.

BRIEF DESCRIPTION OF THE DRAWINGS

For a more complete understanding of the present invention and its features and advantages, reference is now made to the following description, taken in conjunction with the accompanying drawings, in which:

FIGS. 5A and 5B is a flowchart depicting selected elements of an embodiment of a method for validation of a service plugin package;

DESCRIPTION OF PARTICULAR EMBODIMENT(S)

Figure 1:
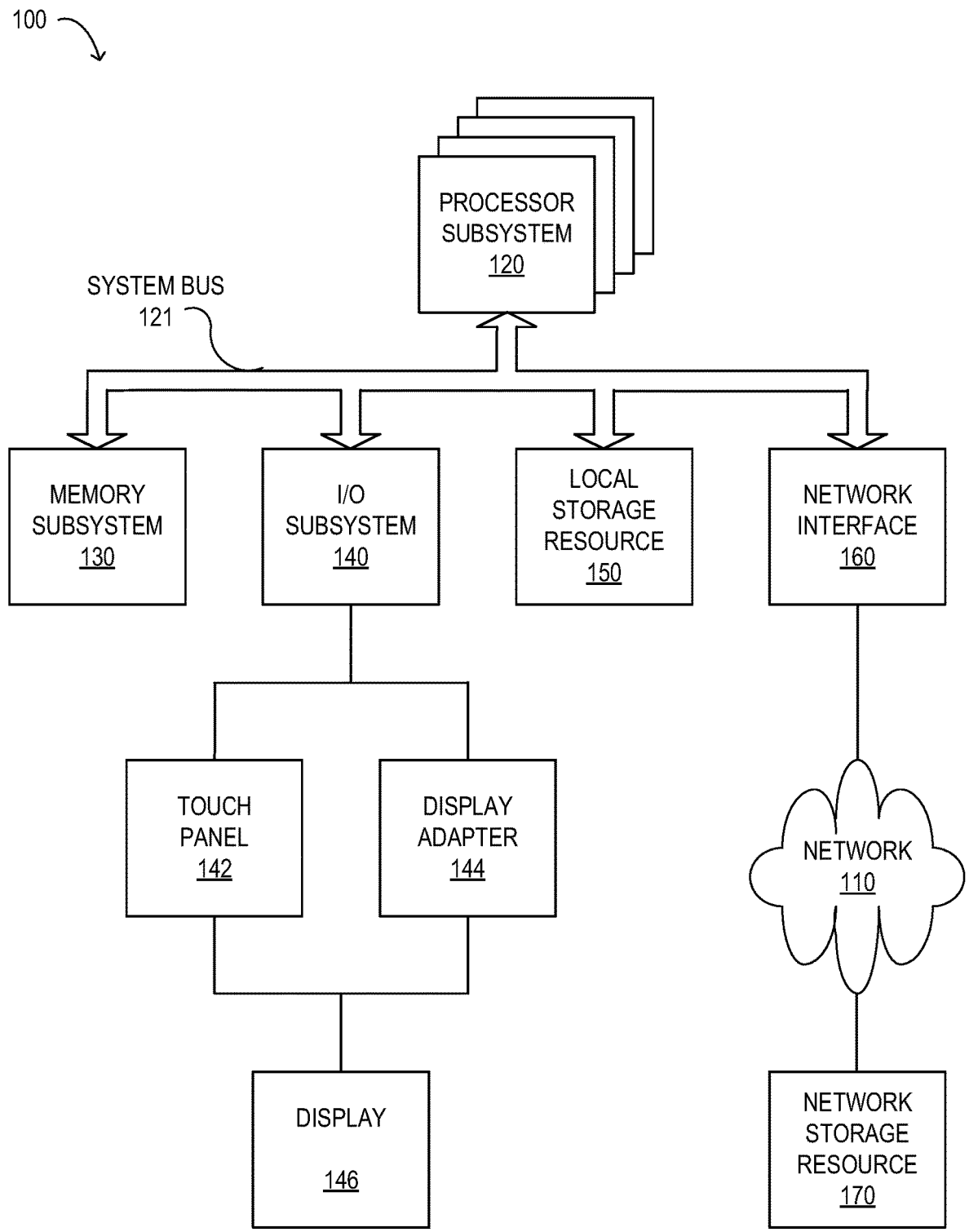
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, 4, 5A, 5B, 6, and 7 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. As shown, I/O subsystem 140 may comprise touch panel 142 and display adapter 144. Touch panel 142 may include circuitry for enabling touch functionality in conjunction with display 146 that is driven by display adapter 144.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

A client-server system may include a client and a management server coupled to each other by a network. The management server may provide management services to the client. Typical client-server system solutions may utilize code based plugins which may require development of both a client-side service plugin for execution on the client in a client environment and a corresponding server-side service plugin for execution on the management server in a management server environment. Other existing client-server system solutions may utilize a generalized management language, for example, windows management instrumentation (WMI) to define a set of environment independent specifications which allow management information to be shared between management applications in a client-server system environment. These client-server system solutions where there is an endpoint agent managed through a management server provide limited or no extensibility or are extensible only through code or management service plugins for both the client solution and the management server solution. Typically, the client solution and the management server solution have distinct technology stacks, operational constraints, and deployment models. This may require a set of developers to have both client solution and server solution skillsets and understand the operational and design constraints in two distinct system environments.

As will be described in further detail herein, the inventors of the present disclosure have discovered methods and systems for providing extended management services utilizing declarative service management plugins. This solution provides a way to develop server-side management capabilities that may be leveraged by a client-side service plugin utilizing software development kit (SDK) and integrated development environment (IDE) extensions. The declarative model for adding new services to a management services environment does not require that the client-side service plugin developer be aware of the operational, deployment, or technology stacks utilized in a server-side management services environment. The client-side service plugin developer only needs to know the management service capabilities and how the client-side service plugin solution should be managed. The client-side service plugin developer only needs to have a client solution skillset and understand the operational and design constraints of the client-side management service environment to be able to add a client-side service plugin to a client-side services suite. This may be accomplished by developing a set of standard, extensible management service components on the management server in a management server environment and developing the corresponding client-side services on the client-side services framework that a client-side service plugin developer would leverage. The SDK also facilitates the development of the client-side service plugins. The SDK generates declarations of management service capabilities that a management server consumes. This methodology allows the client-side service plugin developer the ability to control how the management service capabilities are exposed in the management server.

Figure 2:
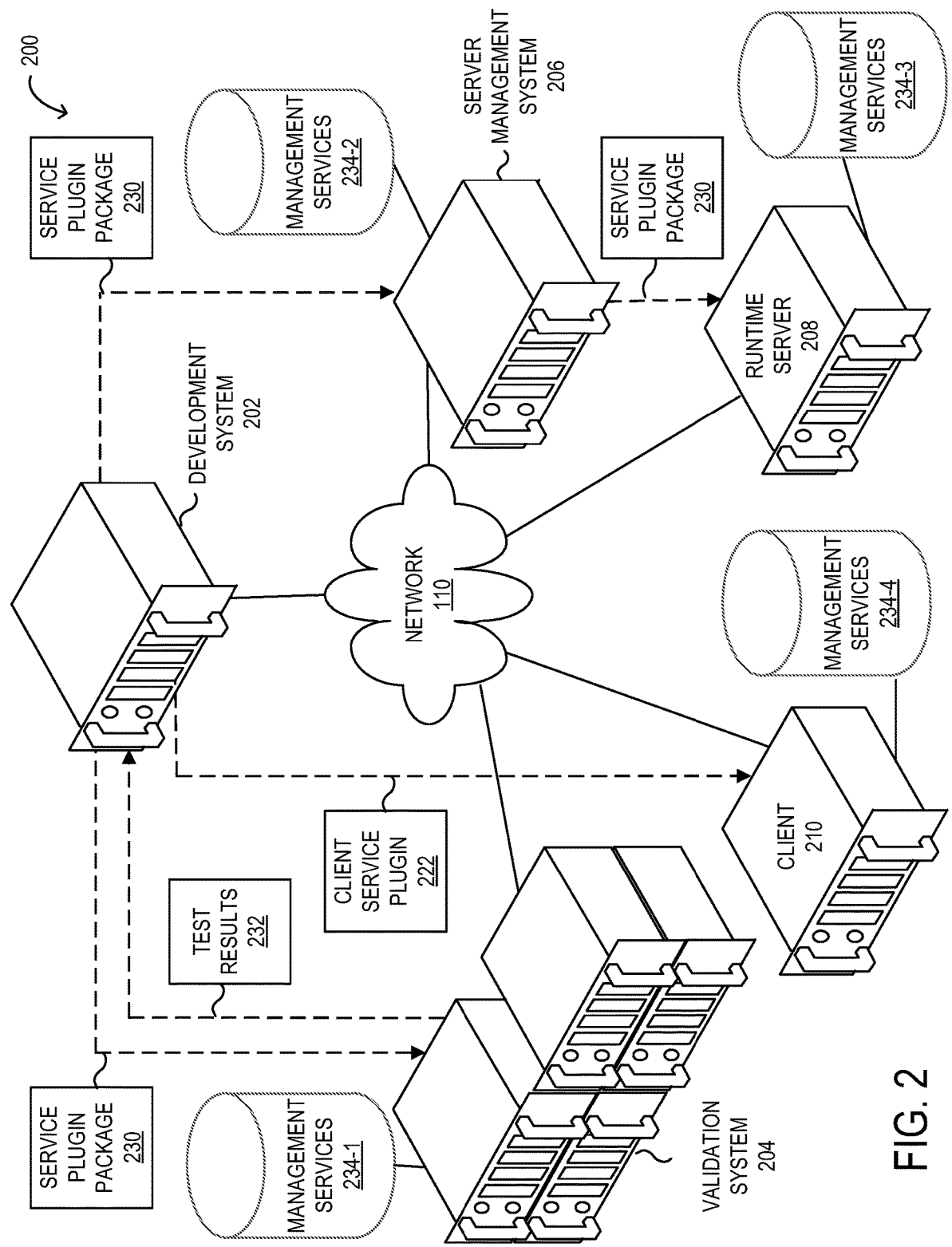
FIG. 2 is a block diagram of selected elements of an embodiment of an exemplary network environment utilizing declarative service management plugins to extend management services.

Turning now to FIG. 2, a block diagram depicting selected elements of an embodiment of an exemplary network environment 200 utilizing declarative service management plugins to extend management services. As shown in FIG. 2, components of network environment 200 may include, but are not limited to, network 110, a development system 202, a validation system 204, a server management system 206, a runtime server 208, and a client 210. In FIG. 2, each of development system 202, validation system 204, server management system 206, runtime server 208, and client 210 may be an information handling system 100 and may be coupled to each other via network 110. Components of network environment 200 may also include one or more sets of management services 234, including a set of management services 234-1, a set of management services 234-2, a set of management services 234-3, and a set of management services 234-4. The set of management services 234-1 may be stored at memory subsystem 130 or local storage resource 150 of validation system 204 or network storage resource 170 of network environment 200. The set of management services 234-1 may be coupled to processor subsystem 120 of validation system 204. Similarly, the set of management services 234-2 may be stored at memory subsystem 130 or local storage resource 150 of server management system 206 or network storage resource 170 of network environment 200. The set of management services 234-2 may be coupled to processor subsystem 120 of server management system 206. In addition, the set of management services 234-3 may be stored at memory subsystem 130 or local storage resource 150 of runtime server 208 or network storage resource 170 of network environment 200. Management services 234-3 may be coupled to processor subsystem 120 of runtime server 208. Similarly, the set of management services 234-4 may be stored at memory subsystem 130 or local storage resource 150 of client 210 or network storage resource 170 of network environment 200. Management services 234-4 may be coupled to processor subsystem 120 of client 210.

Each set of management services 234 may be a server-side set of extensible management services, a client-side set of extensible management services corresponding to the server-side set of extensible management services, or a combination both. Each set of management services 234 are extensible client-side and server-side management services that may provide a core set of management capabilities for new client service plugins. These sets of management services 234 provide a basic framework for extensibility that is declarative.

Development system 202 may include a software development kit (SDK) that may facilitate the development of managed management service plugins. The SDK may be used to generate declarations of management capabilities that a runtime server may consume. This methodology may allow a plugin developer control over how the management capabilities are exposed in runtime server. The SDK may also provide tool stack extensions that a developer may leverage to implement client service plugins. The SDK may include one or more integrated development environment (IDE) extensions and plugins that may allow a developer to use existing software development workflows to develop a client service plugin. The SDK supports assertions within client service plugin source code, such as C# source code, that describe the specific server-side management capabilities associated with a property in the client service plugin source code.

The SDK and the IDE may be used to develop and build a service plugin package 230 from the client service plugin source code. A service plugin package, such as service plugin package 230, may comprise a service plugin identification, a service plugin name, a service plugin description, a client service plugin, a set of client test scripts, a service plugin declaration, a set of extension declarations, a set of help files, management service installation (MSI) information, a set of content files, a set of support files, and security information that may include security certificates. Each extension declaration of the set of extension declarations of service plugin package 230 may comprise a type of the extension declaration that may include one of an event type of the extension declaration that may have event information, a command type of the extension declaration that may have command information, a policy type of the extension declaration that may have policy information, a state type of the extension declaration that may have state information, and a dependency type of the extension declaration that may have dependency information. Each extension declaration of the set of extension declarations may further comprise descriptor information that may describe how the extension declaration may be operationally processed by a runtime server, grouping information that may describe how the extension declaration may be grouped within an existing set of extension declarations of a set of management services 234, ordering information that may describe how the extension declaration may be ordered within the existing set of extension declarations of the set of management services 234, and localization resource information that describes how each extension declaration is processed by the runtime server to support localized resources in multiple locales. In FIG. 2, service plugin package 230 may include a client service plugin 222.

Once service plugin package 230 has been built, development system 202 may validate service plugin package 230 by utilizing validation system 204. Development system 202 may transmit service plugin package 230 to validation system 204. Development system 202 may subsequently receive test results 232 from validation system 204 that may indicate whether service plugin package 230 is valid. When the validation indicator indicates that service plugin package 230 is valid, development system 202 may deploy client service plugin 222 to client 210 by transmitting client service plugin 222 to client 210. Development system 202 may also transmit service plugin package 230 to server management system 206 for deployment of service plugin package 230 to runtime server 208. Prior to transmitting service plugin package 230 to validation system 204 and server management system 206 and transmitting client service plugin 222 to client 210, development system 202 may sign a security certificate of security information of service plugin package 230 associated with service plugin package 230 and another security certificate of security information of service plugin package 230 associated with client service plugin 222 to add a level of security to service plugin package 230 for these components. Development system 202 may also sign other security certificates of security information of service plugin package 230 associated with other components of service plugin package 230, such as for example each extension declaration of the set of extension declarations of service plugin package 230.

Validation system 204 may include a test client and a test runtime server. Validation system 204 may receive service plugin package 230 from development system 202. Validation system 204 may perform an integrity verification process of a security certificate of security information of service plugin package 230 to ensure the integrity of service plugin package 230. In a similar manner, runtime server 208 may perform an integrity verification process of any additional security certificates of service plugin package 230 associated with specific components of service plugin package 230. The test runtime server of validation system 204 may add the set of extension declarations of service plugin package 230 to the set of management services 234-1. The test client of validation system 204 may execute each one of the set of client test scripts of service plugin package 230 that may cause client service plugin 222 of service plugin package 230 to test that each of the updated set of management services 234-1 executes as expected on the test runtime server. The set of client test scripts may test all permutations of the updated set of management services 234-1 to ensure that the service plugin package 230 is valid. Validation system 204 may transmit test results 232 to development system 202 which may indicate whether service plugin package 230 is valid. Test results 232 may include a test result for each one of the set of client test scripts which may indicate whether the corresponding client test script executed successfully or not.

Server management system 206 may include an administration interface that may allow a system administrator to determine how, when, and what portions of service plugin package 230 are to be deployed to one or more runtime servers, such as runtime server 208. Server management system 206 may receive service plugin package 230 from development system 202. Server management system 206 may perform an integrity verification process of a security certificate of security information of service plugin package 230 to ensure the integrity of service plugin package 230. In a similar manner, runtime server 208 may perform an integrity verification process of any additional security certificates of service plugin package 230 associated with specific components of service plugin package 230. Server management system 206 may also deploy service plugin package 230 to runtime server 208 by transmitting service plugin package 230 to runtime server 208.

Upon receiving service plugin package 230 from server management system 206, runtime server 208 may perform an integrity verification process of a security certificate of security information of service plugin package 230 to ensure the integrity of service plugin package 230. In a similar manner, runtime server 208 may perform an integrity verification process of any additional security certificates of service plugin package 230 associated with specific components of service plugin package 230. Runtime server 208 may add the set of extension declarations of service plugin package 230 to the set of management services 234-3. Once the set of extension declarations of service plugin package 230 have been added to the set of management services 234-3, runtime server 208 may provide one or more management services of the set of updated management services 234-3 to client 210 based on client service data communicated by client 210 to runtime server 208 and a subset of the set of extension declarations of the set of updated management services 234-3 corresponding to the one or more management services of the set of updated management services 234-3.

Upon receiving client service plugin 222 from development system 202, client 210 may perform an integrity verification process of a security certificate of security information of client service plugin 222 to ensure the integrity of client service plugin 222. Client 210 may add client service plugin 222 to the set of management services 234-4. Once client service plugin 222 has been added to the set of management services 234-4, client 210 may request runtime server 208 to provide one or more management services of the set of updated management services 234-3 corresponding to client service plugin 222 of the set of updated management services 234-4 to client 210 by communicating client service data associated with the one or more management services to runtime server 208. The development, build, deployment, and runtime operation of service plugin package 230 will be described in further detail below.

Figure 3:
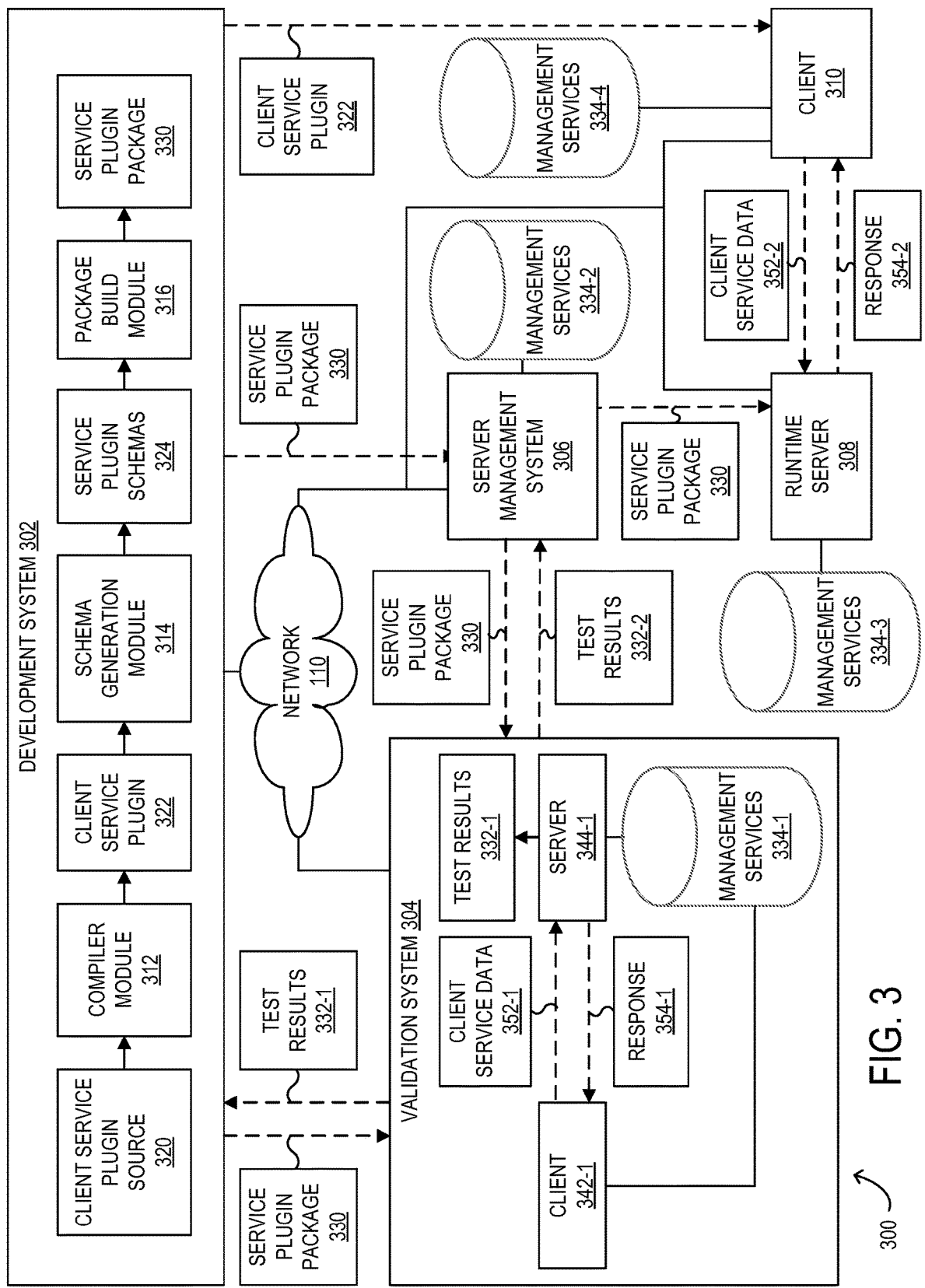
FIG. 3 is a block diagram of selected elements of an embodiment of another exemplary network environment utilizing declarative service management plugins to extend management services.

Turning now to FIG. 3, a block diagram depicting selected elements of an embodiment of an exemplary network environment 300 utilizing declarative service management plugins to extend management services. Network environment 300 is structurally and functionally similar to network environment 200 of FIG. 2 previously described. As shown in FIG. 3, components of network environment 300 may include, but are not limited to, network 110, a development system 302, a validation system 304, a server management system 306, a runtime server 308, and a client 310. Components of network environment 300 may also include one or more sets of management services 334, including a set of management services 334-1, a set of management services 334-2, a set of management services 334-3, and a set of management services 334-4.

Development system 302 may include client service plugin source code 320, an IDE (not shown), and the SDK (not shown) including the tool stack extensions, the one or more IDE extensions, and the plugins described above with reference to FIG. 2. The SDK may also include a compiler module 312, a schema generation module 314, a package build module 316, and one or more development tools. Client service plugin source code 320 may include assertions that describe specific server-side management capabilities associated with a property in client service plugin source code 320 and may specify how an associated set of management services 334 are to be extended. Development system 302 may utilize compiler module 312, the SDK, and the one or more development tools to generate a client service plugin 322, a service plugin declaration, and a set of extension declarations from client service plugin source code 320 and the assertions within client service plugin source code 320. Schema generation module 314 may generate one or more service plugin schemas 324 from client service plugin 322, the service plugin declaration, and the set of extension declarations. Package build module 316 may build service plugin package 330 from the one or more service plugin schemas 324, a service plugin identification, a service plugin name, a service plugin description, client service plugin 322, a set of client test scripts, a set of help files associated with the set of management services 334 corresponding to client service plugin 322, management service installation (MSI) information, a set of content files associated with the set of management services 334 corresponding to client service plugin 322, a set of support files associated with the set of management services 334 corresponding to client service plugin 322, and security information that may include security certificates. Next, development system 302 may transmit service plugin package 330 to validation system 304.

Validation system 304 may include a client 342-1, server 344-1, and management services 334-1 coupled to client 342-1 and server 344-1. Validation system 304 may receive service plugin package 330 from development system 302. Each management service of the set of management services 334-1 may provide its management service to the client. Each management service of the set of management services 334-1 may also allow its management service to be extended.

Each management service of the set of management services 334-1 may support a specific type of management service which may correspond to a specific type of extension declaration of the set of extension declarations of service plugin package 330. For example, a specific management service may support an event type of management service, a command type of management service, a policy type of management service, or a status type of management service, or another type of management service, which may correspond to an event type of extension declaration, a command type of extension declaration, a policy type of extension declaration, or a status type of extension declaration, or another type of extension declaration, respectively.

In one or more embodiments, each extension declaration may also include grouping information that describes how each extension declaration is to be grouped within the current set of extension declarations of the set of management services 334-1. For example, the grouping information of a specific extension declaration may indicate that this specific extension declaration is an encryption security management service and it is to be grouped within the current set of extension declarations of the subset of the encryption security management services of the set of management services 334-1. The grouping information of another extension declaration may indicate that this other extension declaration is a decryption security management service and it is to be grouped within the current set of extension declarations of the subset of the decryption security management services of the set of management services 334-1.

In one or more embodiments, each extension declaration may also include ordering information that describes how each extension declaration is to be ordered within the current set of extension declarations of the set of management services 334-1. For example, the ordering information of a specific policy type extension declaration may indicate that this specific policy type extension declaration is to be ordered such that this specific policy type extension declaration is to be the top policy or the first policy to be processed before any other policy type extension declarations are to be processed or that this specific policy type extension declaration is to be the only policy type extension declaration to be processed. As another example, grouping and ordering information of a specific event type extension declaration may indicate that this specific event extension declaration is to be grouped with error event extension declarations and an associated action of the specific event extension declaration is to be performed prior to other actions associated with other error event extension declarations within the error event extension declaration grouping.

In one or more embodiments, each extension declaration may also include localization resource information that describes how each extension declaration is processed by a runtime server to support localized resources in multiple locales. For example, the localization resource information may include multiple types of localized resources and may indicate how the runtime server is to support resource characteristics of each type of localized resource in a correct locale for a current client. The localized resource may be a display resource that may be utilized by the client service plugin 322 to support a user interface. The runtime server may support displaying display characteristics on the user interface in the correct locale for the current client. For another client in another locale, the runtime server may support displaying the display characteristics on the user interface in the other locale for the other client. Other types of localized resources may be similarly processed by the runtime server.

Each management service of the set of management services 334-1 executing on server 344-1 may identify a subset of the set of extension declarations of service plugin package 330 that has a specific type of extension declaration that corresponds to the specific type of management service it supports. The management service of the set of management services 334-1 that corresponds to the specific type of extension declaration may add the identified subset of the set of extension declarations of service plugin package 330 to the set of management services 334-1.

Client 342-1 may execute each client test script of the set of client test scripts of service plugin package 330. The set of client test scripts of service plugin package 330 may be associated with the set of extension declarations of service plugin package 330 and the updated set of management services 334-1. During execution of each client test script, client service plugin 322 of service plugin package 330 may transmit client service data 352-1 associated with each client test script to server 344-1. Client service data 352-1 may include a management service request, a management service of the set of management services 334-1 that is requested, and data associated with the management service request. Upon receiving client service data 352-1 from client 342-1, server 344-1 may provide the requested management service of the set of management services 334-1 for client 342-1 based on client service data 352-1 and a subset of the set of extension declarations corresponding to the requested management service of the set of management services 334-1. Server 344-1 may transmit a response 354-1 to client 342-1 that may include a test result that may indicate whether the requested management service executed correctly and error code and exception information for any errors or exceptions that may have occurred during execution of the requested management service. Upon receiving response 354-1, client 342-1 may save the test result and the error code and exception information associated with each client test script at test results 322-1. The test result for each client test script may indicate whether each client test script executed successfully or not. When the execution of every client test script of the set of client test scripts is complete, validation system 304 may transmit test results 332 to development system 302. Test results 332-1 may indicate whether service plugin package 330 is valid.

Development system 302 may subsequently receive test results 332-1 from validation system 304 that may indicate whether service plugin package 330 is valid. When test results 332-1 indicate that service plugin package 330 is valid, development system 302 may transmit service plugin package 330 to server management system 306. Development system 302 may also transmit client service plugin 322 to client 310.

Server management system 306 may receive service plugin package 330 from development system 302. Server management system 306 may determine whether service plugin package 330 has been validated. When server management system 306 determines that service plugin package 330 has not been validated, server management system 306 may validate service plugin package 330 by utilizing validation system 304. Server management system 306 may transmit service plugin package 330 to validation system 304. Server management system 306 may subsequently receive test results 332-2 from validation system 304 that may indicate whether service plugin package 330 is valid. When test results 332-2 indicate that service plugin package 330 is valid, server management system 306 may transmit service plugin package 330 to runtime server 308 to deploy service plugin package 330 to runtime server 308.

In response to receiving service plugin package 330, runtime server 308 may add the set of extension declarations of service plugin package 330 to the set of management services 334-3 as previously describe with respect to server 344-1 of validation system 304.

In response to receiving client service plugin 322, client 310 may add client service plugin 322 to the set of management services 334-4. During operation, client service plugin 322 executing on client 310 may request runtime server 308 to provide a management service of the set of updated management services 334-3 to client 310. Client service plugin 322 may request runtime server 308 to provide the management service by transmitting client service data 352-2 to runtime server 308. In response to receiving client service data 352-2 from client 310, runtime server 308 may provide the requested management service of the set of management services 334-3 for client 310 based on client service data 352-2 and a subset of the set of extension declarations corresponding to the requested management service of the set of management services 334-3. Runtime server 308 may also transmit a response 354-2 to client 310 that may include a test result that may indicate whether the requested management service executed correctly and error code and exception information for any errors or exceptions that may have occurred during execution of the requested management service.

Figure 4:
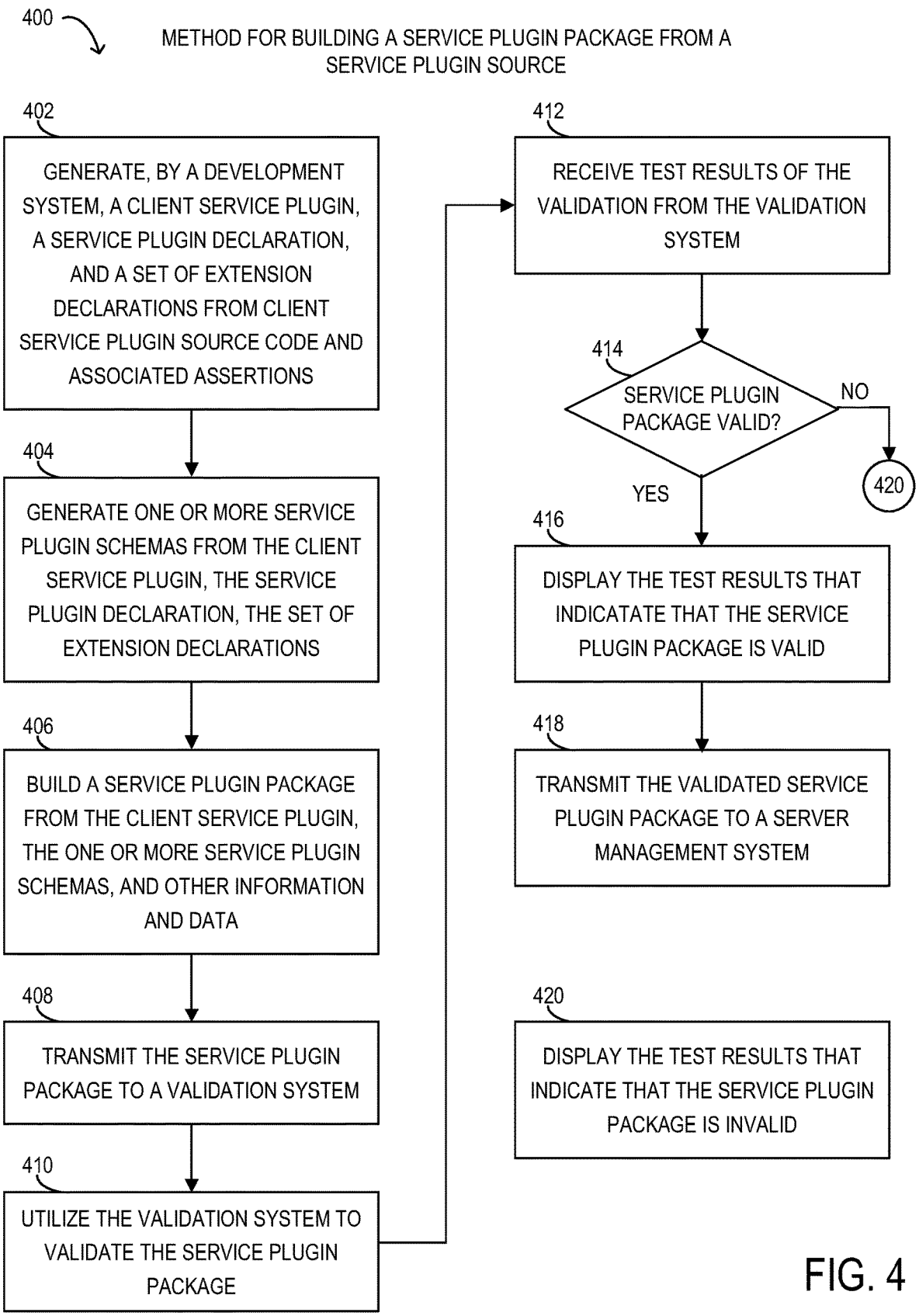
FIG. 4 is a flowchart depicting selected elements of an embodiment of a method for building a service plugin package from source code of a client service plugin.

FIG. 4 is flowchart depicting selected elements of an embodiment of a method for building a service plugin package from source code of a client service plugin. Method 400 may be performed by information handling system 100, development system 202, client 210, development system 302, client 310, previously described with reference to FIGS. 1, 2, and 3, or another information handling system. It is noted that certain operations described in method 400 may be optional or may be rearranged in different embodiments.

Method 400 may begin at step 402, by generating a client service plugin, a service plugin declaration, and a set of extension declarations from client service plugin source code and assertions within the client service plugin source code utilizing a compiler module, the SDK, and the one or more development tools previously described with reference to FIG. 3. At step 404, generating one or more service plugin schemas from the client service plugin, the service plugin declaration, and the set of extension declarations utilizing a schema generation module. At step 406, building a service plugin package from the one or more service plugin schemas, a service plugin identification, a service plugin name, a service plugin description, the client service plugin, a set of client test scripts, a set of help files, MSI information, a set of content files, a set of support files, and security information utilizing a package build module. At step 408, transmitting the service plugin package to a validation system. At step 410, utilizing the validation system to validate the service plugin package. At step 412, receiving test results of the validation of the service plugin package from the validation system. At step 414, determining whether the test results indicate that the service plugin package is valid. When the test results indicate that the service plugin package is valid, the method may proceed to step 416. Otherwise, the method may proceed to step 420. At step 416, displaying the test results that indicate that the service plugin package is valid. At step 418, transmit the validated service plugin package to a server management system for deployment of the service plugin package. At step 420, displaying the test results that indicate that the service plugin package is invalid.

Figure 5B:
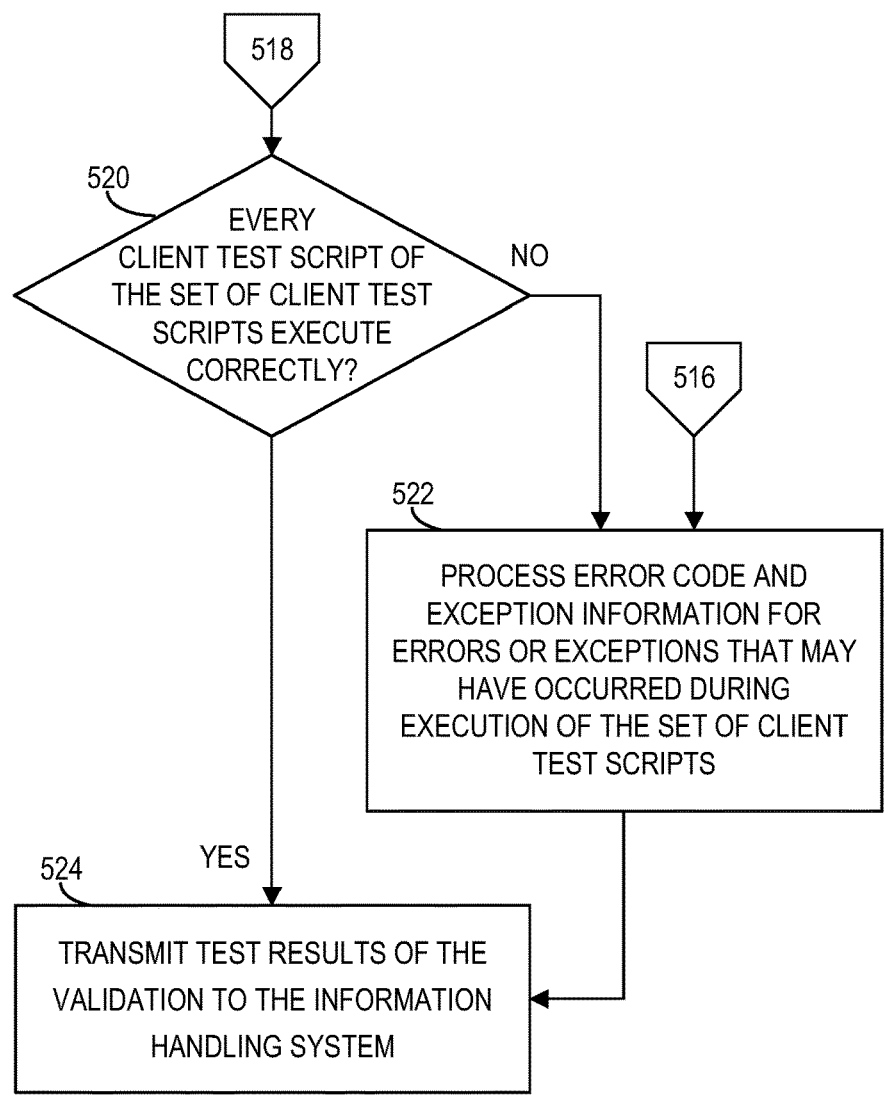

FIGS. 5A and 5B is flowchart depicting selected elements of an embodiment of a method for validation of a service plugin package. Method 500 may be performed by validation system 204, validation system 304, previously described with reference to FIGS. 2 and 3, or another information handling system. It is noted that certain operations described in method 500 may be optional or may be rearranged in different embodiments.

Method 500 may begin at step 502, by receiving, by a validation system including a test client and a test server, a service plugin package from an information handling system via a network. The information handling system may be information handling system 100, development system 202, development system 302, server management system 206, server management system 306, previously described with reference to FIGS. 1, 2, and 3. At step 504, identifying, by each management service of a set of management services executing on the test server, a subset of a set of extension declarations of the service plugin package based on a specific type of management service of each management service supported by each management service and a corresponding specific type of extension declaration of the subset of a set of extension declarations. At step 506, adding, by each management service, each corresponding identified subset of the set of extension declarations to the set of management services. The test server may also add a service plugin declaration, a service plugin identification, a service plugin name, a service plugin description, a set of help files, MSI information, a set of content files, and a set of support files to the set of management services. At step 508, execute by a test client, each client test script of a set of client test scripts of the service plugin package. At step 510, transmit, by the client server plugin executing on the test client, client service data including a management service request to the test server. The management service request may include a management service requested and data associated with the management service request which may include the service plugin identification and the service plugin name. At step 512, providing, by the test server, the requested management service of the set of management services for the test client based on the client service data and a subset of the set of extension declarations corresponding to the requested management service. The management service provided may also be based on the service plugin declaration, the service plugin identification, the service plugin name, and the service plugin description of the service plugin package. At step 514, transmitting, by the test server, a response to the test client. The response may indicate whether the requested management service executed correctly and error code and exception information for any errors or exceptions that may have occurred during execution of the requested management service. At step 516, determining, by the test client, whether the requested management service executed correctly. When the requested management service executed correctly, the method may proceed to step 518. When the requested management service executed incorrectly, the method may proceed to step 524. At step 518, determining, by the test client, whether another client test script of the set of client test scripts remains. When another client test script remains, the method may proceed back to step 508. When another client test script does not remain, the method may proceed to step 520. At step 520, determining, by the test client, whether every client test script of the set of client test scripts executed correctly. When every client test script of the set of client test scripts executed correctly, method may proceed to step 524. When every client test script of the set of client test scripts did not execute correctly, method may proceed to step 522. At step 522, processing, by the test server, error code and exception information for errors or exceptions that may have occurred during execution of the set of client test scripts. At step 524, transmitting, by the test server, test results of the validation of the service plugin package to the information handling system. The test results may indicate whether the service plugin package is valid.

Figure 6:
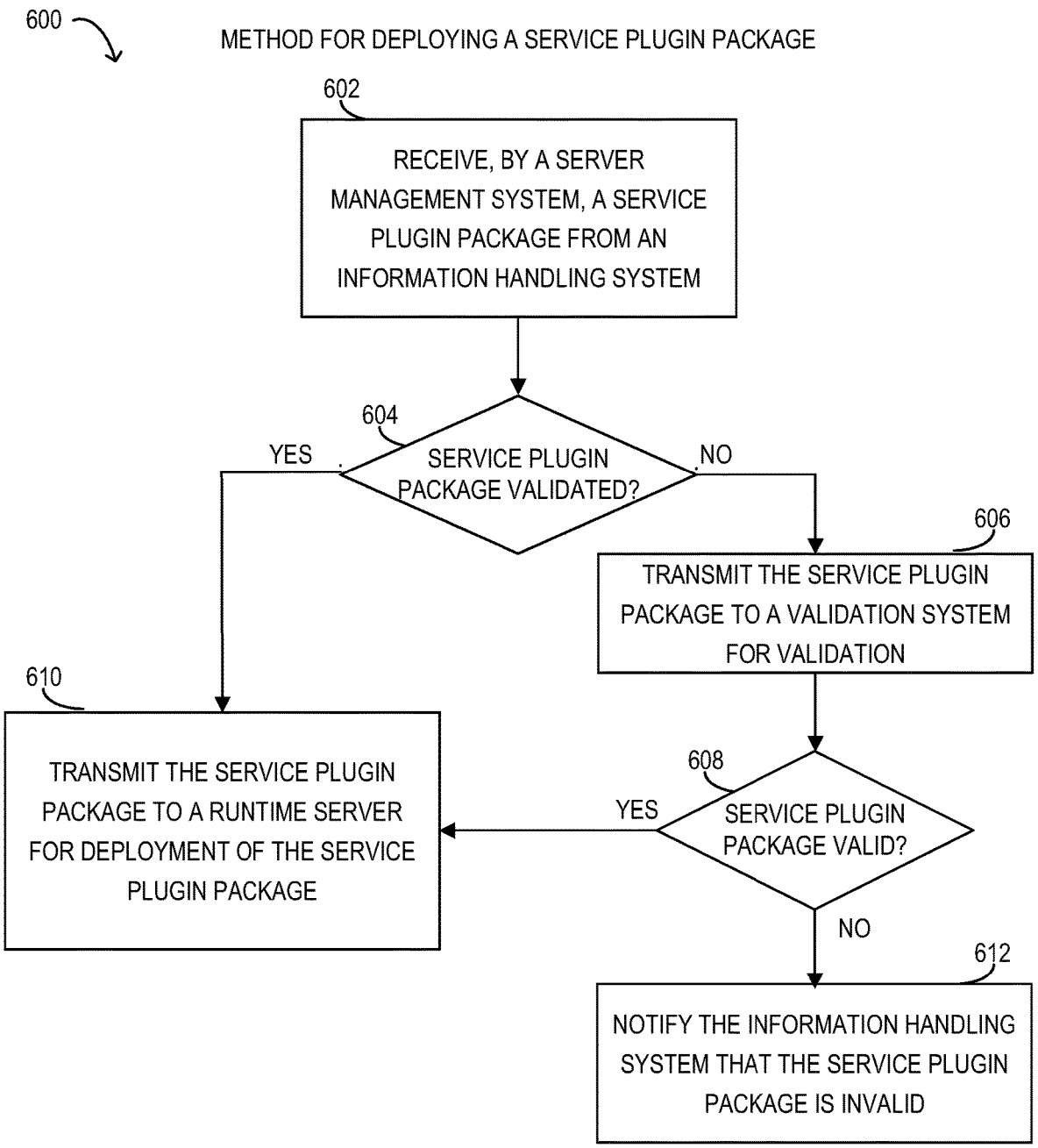
FIG. 6 is a flowchart depicting selected elements of an embodiment of a method for deployment of a service plugin package.

FIG. 6 is flowchart depicting selected elements of an embodiment of a method for deployment of a service plugin package. Method 600 may be performed by server management system 206, server management system 306, information handling system 100, previously described with reference to FIGS. 1, 2, and 3, or another information handling system. It is noted that certain operations described in method 600 may be optional or may be rearranged in different embodiments.

Method 600 may begin at step 602, by receiving, by a server management system, a service plugin package from an information handling system via a network. At step 604, determining whether the service plugin package has been validated. When the service plugin package has not been validated, method may proceed to step 606. When the service plugin package has been validated, method may proceed to step 608. At step 606, transmitting the service plugin package to a validation system for validation. At step 608, determining whether the service plugin package is valid. When the service plugin package is valid, method may proceed to step 610. When the service plugin package is invalid, method may proceed to step 612. At step 610, transmitting the service plugin package to a runtime server for deployment of the service plugin package. At step 612, notifying the information handling system that the service plugin package is invalid.

Figure 7:
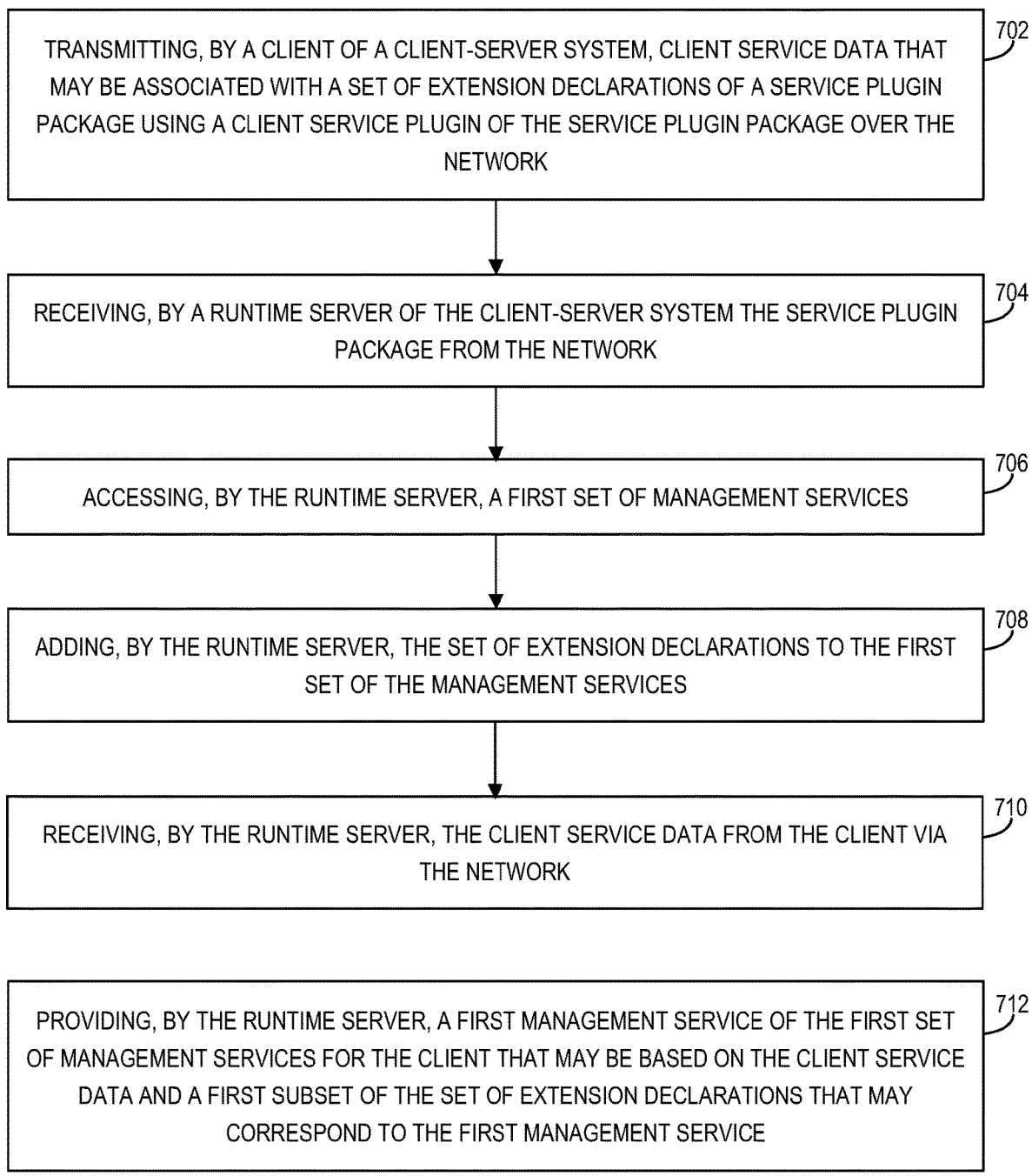
FIG. 7 is a flowchart depicting selected elements of an embodiment of a method for providing extended management services utilizing declarative service management plugins.

FIG. 7 is flowchart depicting selected elements of an embodiment of a method to provide extended management services that utilizes declarative service management plugins. It is noted that certain operations described in method 700 may be optional or may be rearranged in different embodiments.

Method 700 may begin at step 702, by transmitting, by a client of a client-server system, client service data that may be associated with a set of extension declarations of a service plugin package using a client service plugin of the service plugin package over the network. At step 704, receiving, by a runtime server of the client-server system the service plugin package from the network. At step 706, accessing, by the runtime server, a first set of management services. At step 708, adding, by the runtime server, the set of extension declarations to the first set of the management services. At step 710, receiving, by the runtime server, the client service data from the client via the network. At step 712, providing, by the runtime server, a first management service of the first set of management services for the client that may be based on the client service data and a first subset of the set of extension declarations that may correspond to the first management service. The first subset of the set of extension declarations may specify how the first management service may be provided to the client. After step 712, method 700 may end.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A client-server system, comprising:
    a network;
    a client coupled to the network and configured to:
        transmit a service plugin package to a validation system via the network;
        validate the service plugin package utilizing the validation system;
        receive a validation indicator that indicates whether the service plugin pack is valid from the validation system;
        when the validation indicator indicates that the service plugin package is valid, transmit the service plugin package via the network;
        after transmitting the service plugin package, transmit client service data associated with a set of extension declarations of the service plugin package using a client service plugin of the service plugin package over the network;
    a runtime server coupled to the network and configured to:
        receive the service plugin package from the network;
        access a first set of management services;
        identify, for each management service of the first set of management services, a subset of the set of extension declarations of the service plugin package that are supported by the management service;
        add, for each management service of the first set of management services, a respective subset of the set of extension declarations to the respective management service that supports the respective subset of the set of extension declarations, each extension declaration of the set of extension declarations including i) grouping information that describes how the extension declaration is to be grouped within an existing set of extension declarations of the first set of the management services, and ii) ordering information that describes how the extension declaration is to be ordered within a particular grouping of extension declarations of the first set of the management services;
        receive the client service data from the client via the network; and
        provide a first management service of the first set of management services for the client based on the client service data and a first subset of the set of extension declarations corresponding to the first management service,
        wherein the first subset of the set of extension declarations specifies how the first management service is provided to the client.

2. The client-server system of claim 1, wherein the validation system comprises:
    a test client configured to:
        receive the service plugin package from the client via the network;
        execute a set of client test scripts of the service plugin package to cause the client service plugin to transmit test client service data associated with the set of extension declarations over the network; and
        when the execution of the set of client test scripts is complete, transmit the validation indicator that indicates whether the service plugin package is valid to the client, wherein the validation indicator is based on each execution result of each client test script of the set of client test scripts; and
    a test runtime server configured to:
        receive the service plugin package associated with the client service plugin from the client via the network;
        access a second set of the management services, wherein the second set of the management services corresponds to the first set of the management services;

add the set of extension declarations to the second set of the management services;
receive the test client service data from the test client via the network; and
provide a second management service of the second set of management services for the test client based on the test client service data and a second subset of the set of extension declarations corresponding to the second management service.

3. The client-server system of claim 1, wherein the service plugin package comprises one or more of:
a service plugin identification;
a service plugin name;
a service plugin description;
a client service plugin;
a set of client test scripts;
a service plugin declaration;
a set of extension declarations;
a set of help files;
management service installation (MSI) information;
a set of content files;
a set of support files; and
security information including security certificates.

4. The client-server system of claim 1, wherein each extension declaration of the set of extension declarations comprise:
a type of the extension declaration comprising one of:
an event type of the extension declaration including event information;
a command type of the extension declaration including command information;
a policy type of the extension declaration including policy information;
a state type of the extension declaration including state information; and
a dependency type of the extension declaration including dependency information;
descriptor information that describes how the extension declaration is to be operationally processed by the runtime server; and
localization resource information that describes how each extension declaration is to be processed by the runtime server to support localized resources in multiple locales.

5. The client-server system of claim 1, wherein the first set of management services comprises a set of security services.

6. The client-server system of claim 1, the client further configured to:
prior to the transmission of the client service data over the network:
generate the set of extension declarations from a set of assertions within source code of the client service plugin, wherein the set of assertions specifies how the first set of the management services are extended; and
build the service plugin package based on the client server plugin and the set of extension declarations.

7. A method, comprising:
transmitting, by a client of a client-server system, a service plugin package to a validation system via the network;
validating, by the client, the service plugin package utilizing the validation system;
receiving, by the client, a validation indicator that indicates whether the service plugin package is valid from the validation system;
when the validation indicator indicates that the service plugin package is valid, transmitting, by the client, the service plugin package to a runtime server via the network,
after transmitting the service plugin package, transmitting, by the client, client service data associated with a set of extension declarations of the service plugin package using a client service plugin of the service plugin package over the network;
receiving, by a runtime server of the client-server system the service plugin package from the network;
accessing, by the runtime server, a first set of management services;
identifying, by the runtime server and for each management service of the first set of management services, a subset of the set of extension declarations of the service plugin package that are supported by the management service;
adding, by the runtime server and for each management service of the first set of management services, a respective subset of the set of extension declarations to the respective management service that supports the respective subset of the set of extension declarations, each extension declaration of the set of extension declarations including i) grouping information that describes how the extension declaration is to be grouped within an existing set of extension declarations of the first set of the management services, and ii) ordering information that describes how the extension declaration is to be ordered within a particular grouping of extension declarations of the first set of the management services;
receiving, by the runtime server, the client service data from the client via the network; and
providing, by the runtime server, a first management service of the first set of management services for the client based on the client service data and a first subset of the set of extension declarations corresponding to the first management service,
wherein the first subset of the set of extension declarations specifies how the first management service is provided to the client.

8. The method of claim 7, wherein the method further comprises:
receiving, by a test client of the validation system, the service plugin package from the client via the network;
executing, by the test client, a set of client test scripts of the service plugin package to cause the client service plugin to transmit test client service data associated with the set of extension declarations over the network; and
when the execution of the set of client test scripts is complete, transmitting, by the test client, the validation indicator that indicates whether the service plugin package is valid to the client, wherein the validation indicator is based on each execution result of each client test script of the set of client test scripts; and
receiving, by a test runtime server of the validation system, the service plugin package associated with the client service plugin from the client via the network;
accessing, by the test runtime server, a second set of the management services, wherein the second set of the management services corresponds to the first set of the management services;
adding, by the test runtime server, the set of extension declarations to the second set of the management services;

receiving, by the test runtime server, the test client service data from the test client via the network; and providing, by the test runtime server, a second management service of the second set of management services for the test client based on the test client service data and a second subset of the set of extension declarations corresponding to the second management service.

9. The method of claim 7, wherein the service plugin package comprises one or more of:
a service plugin identification;
a service plugin name;
a service plugin description;
a client service plugin;
a set of client test scripts;
a service plugin declaration;
a set of extension declarations;
a set of help files;
management service installation (MSI) information;
a set of content files;
a set of support files; and
security information including security certificates.

10. The method of claim 7, wherein each extension declaration of the set of extension declarations comprises:
a type of the extension declaration comprising one of:
an event type of the extension declaration including event information;
a command type of the extension declaration including command information;
a policy type of the extension declaration including policy information;
a state type of the extension declaration including state information; and
a dependency type of the extension declaration including dependency information;
descriptor information that describes how the extension declaration is to be operationally processed by the runtime server; and
localization resource information that describes how each extension declaration is to be processed by the runtime server to support localized resources in multiple locales.

11. The method of claim 7, wherein the first set of management services comprises a set of security services.

12. The method of claim 7, wherein the method further comprises:
prior to transmitting the client service data over the network:
generating, by the client, the set of extension declarations from a set of assertions within source code of the client service plugin, wherein the set of assertions specifies how the first set of the management services are extended; and
building, by the client, the service plugin package based on the client server plugin and the set of extension declarations.

13. The client-server system of claim 1, wherein a particular extension declaration of a particular subset of the set of extension declarations is associated with i) an error event grouping information and ii) an order of execution with respect to other extension declarations within the error event grouping.

* * * * *